(12) United States Patent
Flykt et al.

(10) Patent No.: US 7,224,800 B1
(45) Date of Patent: May 29, 2007

(54) SYSTEM AND METHOD FOR AUTHENTICATION OF A ROAMING SUBSCRIBER

(75) Inventors: Patrik Flykt, Helsinki (FI); Valtteri Niemi, Helsinki (FI); Jaakko Rajaniemi, Helsinki (FI); Aki Niemi, Espoo (FI)

(73) Assignee: Nokia Corporation, Espoo (FI)

( * ) Notice: Subject to any disclaimer, the term of this patent is extended or adjusted under 35 U.S.C. 154(b) by 705 days.

(21) Appl. No.: 10/181,617

(22) PCT Filed: Nov. 28, 2000

(86) PCT No.: PCT/EP00/11889

§ 371 (c)(1),
(2), (4) Date: Sep. 4, 2002

(87) PCT Pub. No.: WO02/45449

PCT Pub. Date: Jun. 6, 2002

(51) Int. Cl.
*H04K 1/00* (2006.01)
(52) U.S. Cl. ...................... 380/247; 380/270
(58) Field of Classification Search ............... 380/247, 380/270
See application file for complete search history.

(56) References Cited

U.S. PATENT DOCUMENTS 5,319,711 A * 6/1994 Servi ........................ 380/247
6,058,301 A * 5/2000 Daniels ...................... 455/411
6,584,310 B1 * 6/2003 Berenzweig .............. 455/432.1
6,918,035 B1 * 7/2005 Patel ........................... 713/169
6,920,559 B1 * 7/2005 Nessett et al. .............. 713/168

FOREIGN PATENT DOCUMENTS

DE     197 30 301     9/1998

OTHER PUBLICATIONS

Bjornland D.F. et al. "CTM Internetworking: Extending to Roaming Users" 1997 IEEE 47th. Vehicular Technology Conference. Phoenix, May 4-7, 1997, IEEE Vehicular Tech. Conference, New York, IEEE, US, vol. 3, Conf. 47, Nov. 18, 1996, pp. 1146-1150.

* cited by examiner

*Primary Examiner*—Emmanuel L. Moise
*Assistant Examiner*—Ali Abyaneh
(74) *Attorney, Agent, or Firm*—Squire, Sanders & Dempsey, L.L.P.

(57) ABSTRACT

A network system is proposed comprising a first network control element in a visited network, a second network control element in a home network and a communication device (UE) associated to a subscriber, wherein the first network control element is adapted to perform a first authentication (A9) of a roaming subscriber requesting authentication, and the second network control element is adapted to perform a second authentication (A11) of the same subscriber. By this measure, both network control elements are able to verify that the authentication was performed correctly. Also a corresponding method is proposed.

32 Claims, 4 Drawing Sheets

SYSTEM AND METHOD FOR AUTHENTICATION OF A ROAMING SUBSCRIBER

PRIORITY CLAIM

This is a national stage of PCT application No. PCT/EP00/11889, filed on Nov. 28, 2000. Priority is claimed on that application.

FIELD OF THE INVENTION

The present invention relates to a method a network system for performing authentication of a subscriber.

BACKGROUND OF THE INVENTION

The present invention concerns authentication of a subscriber, particularly authentication of a subscriber who is roaming in a network other than his home network.

The general procedure for performing an authentication is described in the following in short. The authentication procedures are similar in GSM and UMTS. Thus, in the following the authentication procedure is described by referring to GSM as an example.

An authentication is usually required when a subscriber registers to the network services. Also an authentication may be required when a connection is established, i.e. when originating or terminating a call. The authentication is performed, for example, in an Authentication Center (AuC) which is usually provided in the Home Location Register (HLR). The VLR to which the MS is currently connected requests a parameter set consisting of a random number RAND (usually, 128 bit) and a scheduled result (RES) from the HLR and sends the RAND to the MS. In turn, the MS has to calculate a result CRES from the number RAND.

The SIM card of the subscriber comprises a secret subscriber key Ki which is, apart from the SIM, only know to the network operator (HLR/AuC). The SIM card also comprises an algorithm (A3). By using this algorithm, from RAND and Ki a result CRES is calculated (CRES=A3 (RAND,Ki)). This result CRES is transmitted to the VLR which in turn checks whether the result is equal to the signed result received from the HLR/AuC, i.e., whether CRES=RES. If this is correct, the authentication is successful.

The above described example is the authentication procedure in GSM. As mentioned above, in UMTS, the authentication of a subscriber is performed similarly. Here, the SGSN (which corresponds to the VLR) requests a parameter set from the HSS (which corresponds to the HLR) comprising a random number RAND, the result RES (which should be the result CRES calculated by User Equipment (UE)), a ciphering key CK, an integrity key IK and an authentication token AUTN. Instead of a SIM card as in GSM, the subscriber uses a so-called USIM (Universal Services Identity Module) which is a logical module implemented e.g. inside a smart card. In comparison to GSM, under UTMS additional functions are provided by the USIM. For example, the USIM checks the authenticity of the network by using the authentication token AUTN. Nevertheless, authentication of the subscriber is performed similarly to the procedure under GSM. That is, a home network control element (like I-CSCF or the like) sends the parameter to a serving network element (i.e., the SGSN or P-CSCF) which forwards these parameters to the USIM. The USIM calculates a result RES from the random number RAND and a secret subscriber key Ki and sends the result back to the serving network element. Thus, by checking the result, it is possible to decide whether the subscriber is allowed to use the services or not.

However, in the above procedure the home network control element (e.g., I-CSCF (Interrogating Call State Control Function) or S-CSCF (serving Call State Control Function)) completely transfers the decision to the serving network element (e.g., P-CSCF (proxy CSCF)). This is acceptable as long as both network elements are operated by the same network operator or the network operators can fully trust on each other. However, in case different networks operated by different network operators are concerned, there might arise security problems.

For example, the visited network can have such a structure that the home network operator might fear that the visited network is easy to manipulate. That is, someone which is not authorized can try to authenticate himself as a subscriber to the home network operator. Now, the not authorized person might be able to overrule the authentication procedures in the visited network. Thus, the visited network indicates to the home network that the authentication was positive although the authentication was not performed or was corrupted. This is particular a problem in case of a world wide roaming, which is possible in UMTS. In addition, this can be a problem for the Internet Multimedia Core Network Subsystem IM CN SS, since here, for example, different service costs might have to be paid. Thus, a non-authorized person cannot be charged or the real subscriber can be charged although he has not used the service.

SUMMARY OF THE INVENTION

Therefore, the object underlying the invention resides in removing the above drawbacks of the prior art and to enable a reliable authentication.

This object is solved by a network system comprising a first network control element, a second network control element and a communication device associated to a subscriber, wherein
  the first network control element is adapted to perform a first authentication of a subscriber requesting authentication, and
  the second network control element is adapted to perform a second authentication of the same subscriber.

Alternatively, the above object is achieved by a method for performing authentication of a subscriber in a network system comprising a first network control element and a second network control element, the method including the steps of
  performing a first authentication of the subscriber by the first network control element, and
  performing a second authentication of the same subscriber by the second network control element.

Thus, two authentications of the same subscriber are performed. That is, both network control elements can independently from each other check whether the subscriber is entitled to use the network services.

Furthermore, one network control element is able to check whether the other network control element has correctly performed the authentication.

Hence, a more reliable authentication is possible, in particular in case the two network control elements are independent from each other, e.g., are operated by different network operators.

The subscriber may be authorized to access network services only in case the first and the second authentication are successful.

The first network control element may control a first network, and the second network control element may control a second network. That is, in this case two different and possible independent networks are concerned. The invention is in particular advantageous in case of two different networks, when a subscriber is roaming from his home network into another, a visited network which may be operated by another network operator.

The communication device of the subscriber may calculate a result from a predetermined number.

Furthermore, a first predetermined number for the first authentication and a second predetermined number for the second authentication may be transmitted to the communication device, and a first result and a second result may be calculated by the communication device, wherein the first result is used for the first authentication, and the second result is used for the second authentication. Thus, the authentications (or verifications) can be established independently from each other.

Each of the first and second authentication may be performed by comparing the result with a scheduled result. Thus, each authentication can easily be performed by comparing of numbers.

It may be prohibited to forward the scheduled result for the second authentication to the first network control element. Thus, the second network control element, which may control the home network of the subscriber, can be sure that the first network control element cannot manipulate the second authentication in the second network control element.

The communication device may calculate a result from a predetermined number in the communication device and establish an authentication code from a part or all of the message sent to the network containing the predetermined number. Then, the first authentication is performed by using the result, and the second authentication is performed by using the authentication code. In this case, the first authentication may be performed by comparing the result received from the communication device with a scheduled result.

The part of the message may be a ciphering key (CK), an integrity key (IK) or combination of both. In addition, also other parts of the message can be chosen as a key code by which the second authentication can be performed. This part or even the definition where in the message the part is located can be kept secret by the first network, i.e., the home network. By this measure, it can be ensured that the operator of the visited network does not know exactly what kind of values are used for the authentication in the home network. This contributes to reliability of the authentication.

Furthermore, one predetermined number for the authentication may be transmitted to the communication device, wherein the communication device calculates one result from the predetermined number. Then, a first part of the result is used for the first authentication, and a second part of the result is used for the second authentication. Thus, no additional work load is posed on the communication device, and also it is not necessary to transmit additional numbers.

In the above case, each of the first and second authentication may be performed by comparing the respective part of the result with a scheduled result.

Furthermore, also in this case it may be prohibited that the scheduled result for the second authentication is forwarded to the first network control element, in order that the second network control element is capable to check whether the first network control element has performed the authentication correctly.

The predetermined number and the scheduled result may be provided by a home subscriber database such as HSS (Home Subscriber Server), or by an Authentication Centre (AuC) or an Authentication Authorization and Accounting server (AAA).

The calculations performed in the above procedures may be performed by using GSM or UMTS algorithms.

The first and the second network control element may be Call State Control Functions (CSCF), wherein the first network control element may be a proxy CSCF (P-CSCF) and the second network control element may be an Interrogating CSCF (I-CSCF), a Home Subscriber Server (HSS) or a Serving CSCF (S-CSCF). The home subscriber database may be a Home Subscriber Server (HSS) Each network may be an Internet multimedia core network subsystem (IM CN SS) according to the architecture specified e.g. in the 3GPP.

BRIEF DESCRIPTION OF THE DRAWINGS

The present invention will be more readily understood with reference to the accompanying drawings in which.

DETAILED DESCRIPTION OF EMBODIMENTS

In the following, preferred embodiments of the invention are described in more detail with reference to the accompanying drawings.

Figure 1:
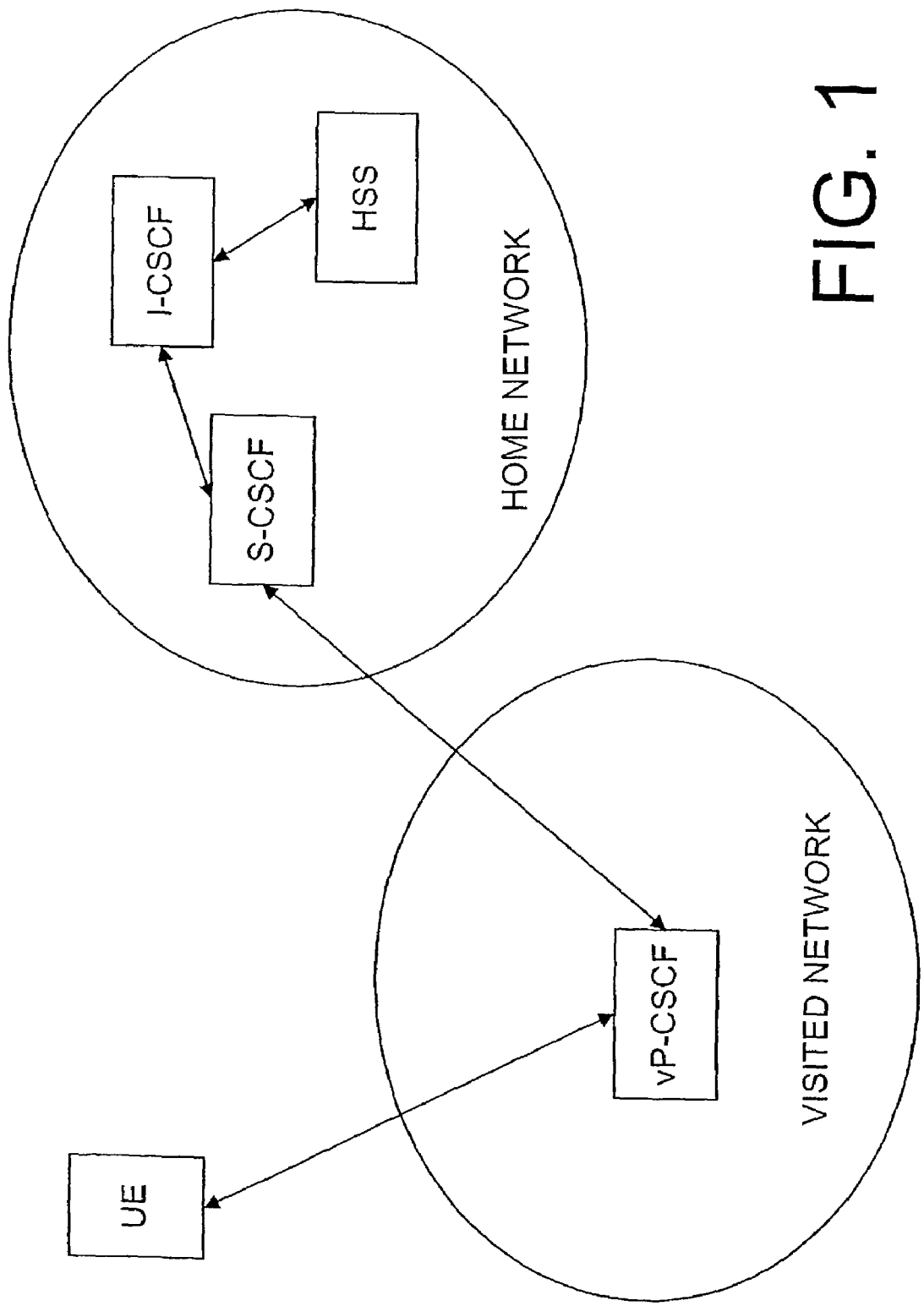
FIG. 1 shows a network system to which the embodiments are applied.

In the description of the embodiments, a network system as schematically illustrated in FIG. 1 is taken as an example. In detail, this system consists of two networks which both are Internet Multimedia Core Network Subsystems (IM CN SS). In the figure, only the main elements are shown.

Both networks contain CSCFs (Call State Control Functions). A User Equipment (UE), which may be a mobile station (MS), is connected to the home network S-CSCF via the P-CSCF if the home network controls the connections. In this case, it is assumed that the subscriber is roaming in a network which is not the home network of the subscriber using the UE. Thus, this network is designated as the visited network, and the P-CSCF is designated in more detail as a vP-CSCF (visited P-CSCF).

For an authentication procedure and the like, the vP-CSCF contacts the home network of the subscriber. That is, the vP-CSCF contacts an Interrogating CSCF (I-CSCF) of the home network which is capable of accessing a Home Subscriber Server (HSS).

It is noted that the connection may be controlled by the visited network. In this case, the connection is not controlled by the hS-CSCF in the home network (as shown in FIG. 1) but by a vS-CSCF in the visited network.

Figure 2:
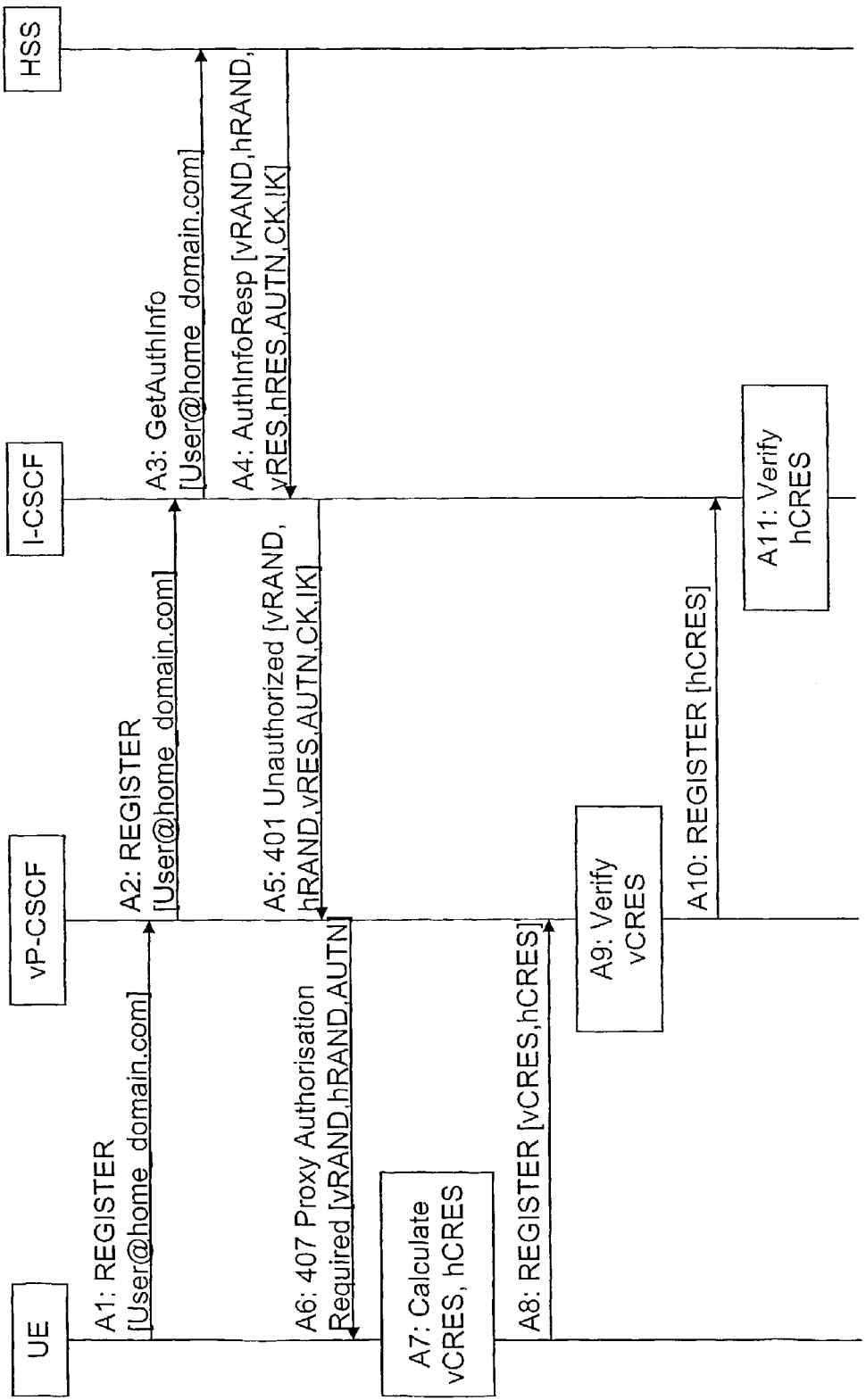
FIG. 2 shows a UMTS authentication procedure according to a first embodiment.
Figure 3:
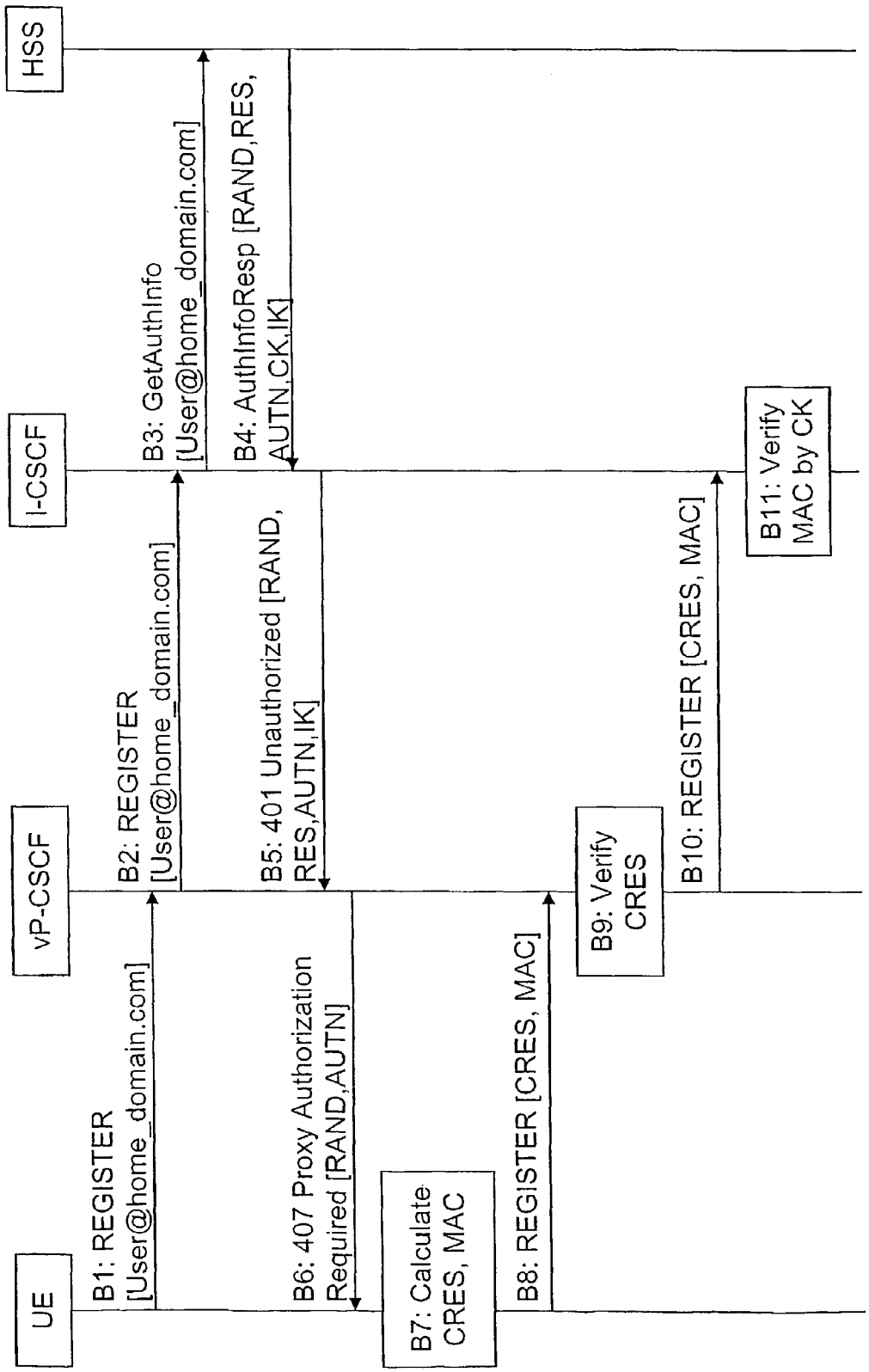
FIG. 3 shows a UMTS authentication procedure according to a second embodiment.
Figure 4:
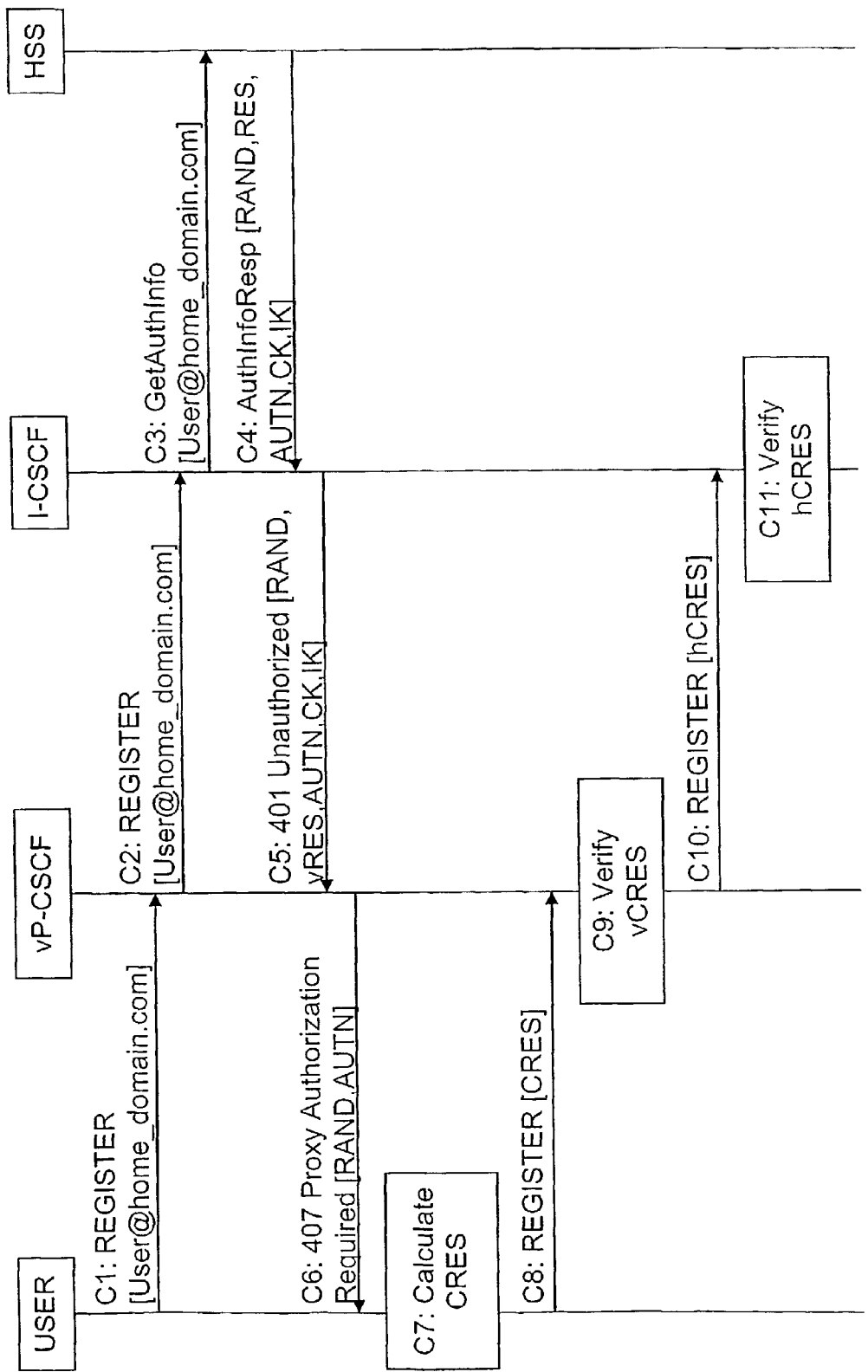
FIG. 4 shows a UMTS authentication procedure according to a third embodiment.

The procedures performed during authentication of the subscriber are described in the first to third embodiments (1 to 3) by referring to FIGS. 2 to 4.

According to these embodiments, the authentication is performed by the I-CSCF (or S-CSCF or HSS or a separate network element such AAA (Authentication Authorization and Accounting server)) and the vP-CSCF. Thus, both the serving network (controlled by the vP-CSCF) and the home network (controlled by the I-CSCF) are able to verify that the authentication was performed correctly. In the following, it is assumed that the authentication in the home network is performed by the I-CSCF. Thus, in the signalling diagrams of FIGS. 2 to 4, the S-CSCF are omitted.

FIG. 2 shows a signaling flow of an authentication procedure according to the first embodiment.

In case the user registers to the network, the UE sends a registration request to the vP-CSCF (step A1). This can be a SIP (Session Initiation Protocol) REGISTER message, for example. The vP-CSCF forwards this request to the home network, i.e., to the I-CSCF (step A2) since in order to perform authentication, the vP-CSCF has to obtain the necessary authentication information. The I-CSCF, in turn, sends a GetAuthInfo (Get Authorization Information) message to the HSS (step A3).

The HSS responds with an Authorization Information Response (AuthInfoResp) (step A4). This response includes a plurality of parameters VRAND, hRAND, VRES, hRES AUTN, CK, IK. That is, two random numbers, visited RAND (VRAND) and home RAND (hRAND) are sent. The number vRAND is intended for an authentication check performed in the visited network, whereas the number hRAND is intended for an authentication check performed by the home network. In addition, also two scheduled results (i.e., the results which should be calculated by the user equipment) are included in the parameters, namely visited RES (VRES) and home RES (hRES). Corresponding to VRAND and hRAND, the visited network uses vRES for the authentication, whereas the home network uses hRES for the authentication.

The I-CSCF retrieves hRES from the parameters and forwards a 401 Unauthorized message to the vP-CSCF (step A5). It is noted that the number hRES is not forwarded to the visited network (i.e., serving network) because the main idea of the hRAND is to verify the calculated hRES only in the home network. The vP-CSCF retrieves vRES from the parameters and forwards a 407 Proxy Authorization Required message to the User Equipment (UE) (step A6).

Then, the UE uses the number VRAND to calculate a result vCRES, and the number hRAND to calculate a result hCRES (step A7). The calculation is performed by using a special predetermined algorithm (e.g. UMTS algorithms) and a secret subscriber key Ki which are stored on the USIM card of the subscriber and which are only known to the HSS.

Thereafter, the UE sends a new register message (another SIP REGISTER message, for example) to the vP-CSCF including the results of calculation, i.e., vCRES and hCRES (step A8). The vP-CSCF retrieves vCRES from the parameters and verifies whether this number is identical to the number vRES received from the HSS of the home network of the subscriber. In case both numbers are not identical, the authentication fails and the registration request of the UE is rejected.

Otherwise, a register request including hCRES is forwarded to the I-CSCF in the home network of the subscriber (step A10). The I-CSCF verifies hCRES by comparing the received number hCRES with the number hRES of the HSS. In case both numbers are identical, the authentication is accepted. Otherwise, the authentication fails and the registration request of the UE is rejected. Thus, according to the first embodiment, the home network sends on receiving a registration request (e.g. SIP REGISTER) two RANDs, visited RAND (vRAND) and home RAND (hRAND). vCRES is calculated from VRAND. The scheduled result for the home network (i.e., hRES) is not forwarded to the visited network. In this way, the home network is able to verify that the visited network has actually performed the authentication and that the subscriber is roaming in that visited network. vCRES, which is calculated from the vRAND, is verified in the visited network (vP-CSCF). By this way the visited network is able to verify that a legitimate subscriber is roaming in the network.

Next, another procedure for performing authentication is described by referring to FIG. 3.

According to the second embodiment, only one RAND number and the corresponding RES number (i.e., the scheduled result) is sent to the visited network. The visited network performs authentication by using these RAND and RES numbers. The home network verifies the authentication by using the ciphering key CK.

In detail, the UE sends a registration request to the vP-CSCF which is forwarded to the I-CSCF. Since the steps B1 to B3 are similar to the steps A1 to A3 according to the first embodiment, an unnecessary repetition is omitted here.

The HSS sends an AuthInfoResp message including the parameters RAND, AUTN, RES, CK and IK to the I-CSCF (step B4). The I-CSCF retrieves only the ciphering key CK from the parameters and forwards a 401 Unauthorized message to the vP-CSCF in which no CK is included (step B5). The vP-CSCF retrieves the number RES from the parameters and forwards a 407 Proxy Authorization Required message to the UE, in which no RES is included (step B6).

The UE calculates CRES from RAND and the secret subscriber key Ki by using the predetermined algorithm. In addition, the UE calculates a message authorization code (MAC) by using the ciphering key CK. Alternatively, the MAC may be calculated from some other part of the SIP message which is sent in step B6. The MAC may be included in a SIP Authorization field or the like (step B7).

After completing the calculations, the UE sends a register message including RES and MAC to the vP-CSCF (step B8). The vP-CSCF verifies the calculated result CRES with the number RES received from the HSS. In case the numbers do not coincide, the authentication fails and the registration request is rejected.

Otherwise, the vP-CSCF forwards a register message including CRES and MAC to the I-CSCF (step B10). The I-CSCF verifies the authorization by checking the MAC (step B11). That is, the I-CSCF itself calculates a value MAC by using CK and compares this with the value MAC obtained from the UE. Since the value CRES is also forwarded to the I-CSCF, the I-CSCF can check whether CRES and RES are identical. That is, the I-CSCF can check whether the authentication procedure performed by the vP-CSCF was correct.

It is noted that forwarding of CRES to the I-CSCF is not necessary, but can be performed in order to have a more reliable authentication.

Furthermore, the authorization field (MAC) may be calculated by using different algorithms. Furthermore, it is also possible to use IK instead of CK and to use Proxy Authorization for adding a new protection between the vP-CSCF and the user. Moreover, apart from using either CK or IK, also both can be used to verify the user.

Thus, according to the second embodiment the home network sends on receiving the registration request (e.g. SIP REGISTER) only RAND and the corresponding RES to the visited network. The home network does not send either CK or IK or both (if IK and CK are not needed in e.g. the P-CSCF). The secret CK (or IK or both) is used to calculate the message authentication code in the terminal (UE), which is verified in the home network. By this way, the home network verifies that the visited network actually has performed the authentication and the subscriber is roaming in that network. RES, which is calculated from the RAND in the USIM is verified in the visited network (vP-CSCF). By this way, the visited network verifies that a legitimate subscriber is roaming in the network.

As a further modification of the second embodiment, it is also possible that the visited network uses MAC instead of RAND for authentication, whereas the home network uses RAND instead of MAC for authentication.

Next, another authentication procedure is described as a third embodiment by referring to FIG. 4.

According to the third embodiment, the result RES is divided into two parts. For example, RES may consist of 128 bits. Then, the first 64 bits may form vRES, and the last 64 bits may form hRES. The home network sends only vRES to the visited network. The UE performs only one calculation, i.e., calculates CRES from RAND.

The steps C1 to C4 shown in FIG. 4 are similar to the steps B1 to B4 of FIG. 3, thus an unnecessary repetition of the description thereof is omitted.

Thus, the I-CSCF obtains in particular the scheduled result RES from the HSS. The I-CSCF splits the number RES in two parts, as indicated above, i.e., as vRES and hRES. This division into two parts can also be done already in the generating unit, in this case HSS. Thereafter, the I-CSCF sends a 401 Unauthorized message including vRES to the vP-CSCF (step C5). It is noted that in this message neither RES nor hRES is included, such that no fake authentication can be performed in the visited network.

The number RAND is forwarded in an 407 Proxy Authorization Required message to the UE (step C6), and the UE calculates only the result CRES from the number RAND by using the secret subscriber key Ki and the predetermined algorithm. The UE forwards a register message to the vP-CSCF including the calculated result CRES. The vP-CSCF verifies the calculated result (step C9). For example, the vP-CSCF may split CRES into a hCRES and a vCRES similar as the I-CSCF splits RES. Then, the vP-CSCF can easily compare vCRES with vRES.

In case the verification was positive, the vP-CSCF sends a register message to the I-CSCF in which only the part hCRES of the calculated result CRES is included (step C10). The I-CSCF verifies hCRES by comparing it with hRES obtained as described above (step 11). If also this verification is positive, the authentication is accepted and the register request can be accepted.

It is noted that in step C10 also the whole result CRES may be forwarded to the I-CSCF and that the result may be split by the I-CSCF (for example, by masking one half thereof or the like).

Hence, according to the third embodiment, the home sends on receiving the registration request RAND and only part of the RES, e.g. vRES=first 64 bits of the RES, to the visited network. The home network does not send the whole RES, e.g. hRES=latter 64 bits of the RES, to the visited network (i.e., serving network), because that part is used in the home network to verify that the visited network actually performed the authentication and the subscriber is roaming in that network. The user calculates the CRES from the RAND and sends it to the network. P-CSCF verifies the vRES from the CRES (e.g. first 64 bits of the RES) and forwards the CRES (or the part it did not check already) to the home network. The home network verifies the CRES by using the latter part of RES, i.e., hRES.

The above description and accompanying drawings only illustrate the present invention by way of example. Thus, the embodiment may vary within the scope of the attached claims.

For example, important variations of the above described embodiments are obtained when also the transfer of the keys CK and IK are controlled. It is not needed to send any information to the visited network that the visited network does not use. For instance, one key can be used for protection of further signaling between the home network and the user while another key is used for protection of further signaling between the visited network and the user. Also, both keys can be kept only in the home network.

In another variation, the key material generated in the generating unit, in the above examples HSS, can be divided into parts more freely, hence dividing also one key into pieces. Generation of more bits for keys than is specified for 3GPP UMTS AKA (Authentication and Key Agreement) mechanism is a natural extension which can also be used. That is, in principle any part or even all of the messages sent in steps B6 (or even in steps A6 and C6 with corresponding modifications of the first and third embodiment), for example, can be defined as such a key material.

Furthermore, it is noted that in the embodiments described above the IM CN SS (Internet Multimedia Core Network Subsystem) was only mentioned as an example. The invention is by no way limited thereon and can be applied to any kind of network system in which two different network control elements are concerned and perform authentication. For example, the invention can also be applied to a GSM and UMTS network systems. It can also be applied in $3^{rd}$ generation mobile systems where requirements of home control in authentication of the subscriber are strict, as is typically the case in many systems specified in so-called 3GPP2 in North America.

Moreover, the embodiments can be freely combined. By such combinations, an even more reliable authentication is possible.

Furthermore, it is possible to send many authentication vectors (i.e., the above-described sets of parameters including e.g. RAND, RES and the like) from the home generating unit, in our example HSS, to the visited network even in advance. (In GSM this is normal practice.) In this case the visited network can send the challenge and authentication token to the UE without contacting home network first. This variation saves signaling capacity. If this is done, the visited network has to identify uniquely the used challenge in order to make it possible to check the hRES response in the home network correctly.

What is claimed is:

1. A network system comprising:
a first network control element configured to perform a first authentication of a subscriber requesting authentication;
a second network control element configured to perform a second authentication of the same subscriber; and
a communication device associated to a subscriber;
wherein the first network control element and the second network control element perform the first and second authentications independently from each other;
wherein a first predetermined number for the first authentication and a second predetermined number for the second authentication are transmitted to the communication device, and the communication device calculates a first result and a second result which are used for first and second authentication, respectively, and each authentication is performed by comparing the first and second results with a scheduled result, respectively; and wherein the second network control element controls a home network of the subscriber and does not forward the scheduled result for the second authentication to the first network control element.

2. The network system according to claim 1, wherein the subscriber is authorized to access network services when the first and the second authentication are successful.

3. The network system according to claim 1, wherein the first network control element controls a first network, and the second network control element controls a second network.

4. The network system according to claim 1, wherein the communication device is adapted to calculate a result from a predetermined number supplied by the first network control element.

5. The network system according to claim 4, wherein the calculation is performed by using GSM or UMTS algorithms.

6. A network system, comprising:
a first network control element configured to perform a first authentication of a subscriber requesting authentication;
a second network control element configured to perform a second authentication of the same subscriber; and
a communication device associated to the subscriber;
wherein the first network control element and the second network control element perform the first and second authentications independently from each other;
wherein the communication device is configured to calculate a result from a predetermined number and to establish an authentication code from a part or all of a message sent to the network containing the predetermined number, the first network control element uses the result for authentication, and the second network control element uses the authentication code for the second authentication;
wherein the first authentication is performed by comparing the result received from the communication device with a scheduled result; and
wherein the second network control element controls a home network of the subscriber and does not forward a key code for the second authentication to the first network control element.

7. The network system according to claim 6, wherein the part of the message is a ciphering key.

8. The network system according to claim 6, wherein the part of the message is an integrity key.

9. The network system according to claim 6, wherein the part of the message consists of a ciphering key and an integrity key.

10. The network system according to claim 6, wherein the predetermined numbers and the scheduled result are provided by a home subscriber database.

11. The network system according to claim 6, wherein the predetermined numbers and the scheduled result are provided by an authentication center or an authentication authorization and accounting server.

12. A network system, comprising:
a first network control element configured to perform a first authentication of a subscriber requesting authentication;
a second network control element configured to perform a second authentication of the same subscriber; and
a communication device associated to subscriber;
wherein the first network control element and the second network control element perform the first and second authentications independently from each other;

wherein one predetermined number for the authentication is transmitted to the communication device, and the communication device calculates a result from the predetermined number, wherein a first part of the result is used for the first authentication by the first network control element and a second part of the result is used for the second authentication by the second network control element;
wherein each authentication is performed by comparing a respective part of the first and second results with a scheduled result; and
wherein the second network control element controls a home network of the subscriber and does not forward the scheduled result for the second authentication to the first network control element.

13. The network system according claim 12, wherein the predetermined numbers and the scheduled result are provided by a home subscriber database.

14. The network system according claim 12, wherein the predetermined numbers and the scheduled result are provided by an authentication center or an authentication authorization and accounting server.

15. The network system according to claim 12, wherein the predetermined numbers and the scheduled result are provided by a home subscriber database.

16. The network system according to claim 12, wherein the predetermined numbers and the scheduled result are provided by an authentication center or an authentication authorization and accounting server.

17. A method for performing authentication of a subscriber in a network system comprising a first network control element and a second network control element, the method including:
performing a first authentication of the subscriber by the first network control element;
performing a second authentication of the same subscriber by the second network control element;
transmitting a first predetermined number for the first authentication and a second predetermined number for the second authentication to a communication device;
calculating a first result and a second result by the communication device;
using the first result for the first authentication;
using the second result for the second authentication, wherein each authentication is performed by comparing the first and second results with a scheduled result; and
prohibiting the scheduled result for the second authentication from being forwarded to the first network control element;
wherein the first authentication step and the second authentication step are performed independently from each other.

18. The method according to claim 17, further comprising the step of:
authorizing the subscriber to access network services when the first and the second authentication are successful.

19. The method according to claim 17, wherein the first network control element controls a first network, and the second network control element controls a second network.

20. The method according to claim 17, comprising the steps of:

calculating a result from a predetermined number in the communication device.

21. The method according to claim 20, wherein the calculating step is performed by using GSM or UMTS algorithms.

22. The method according to claim 17, wherein the predetermined numbers and the scheduled result are provided by a home subscriber database.

23. The method according to claim 17, wherein the predetermined numbers and the scheduled result are provided by an authentication center or an authentication authorization and accounting server.

24. A method for performing authentication of a subscriber in a network system comprising a first network control element and a second network control element, the method including:
    performing a first authentication of the subscriber by the first network control element;
    performing a second authentication of the same subscriber by the second network control element, wherein the first authentication step and the second authentication step are performed independently from each other;
    calculating a result from a predetermined number in a communication device;
    establishing an authentication code from a part or all of the message sent to the network containing the predetermined number in the communication device;
    performing the first authentication by using the result;
    performing the second authentication by using the authentication code, wherein the first authentication value is performed by comparing the result received from the communication device with a scheduled result; and
    prohibiting the key code for the second authentication from being forwarded to the first network control element.

25. The method according to claim 24, wherein the part of the message is a ciphering key.

26. The method according to claim 24, wherein the part of the message is an integrity key.

27. The method according to claim 24, wherein the part of the message consists of a ciphering key and an integrity key.

28. The method according to claim 24, wherein the predetermined numbers and the scheduled result are provided by a home subscriber database.

29. The method according to claim 24, wherein the predetermined numbers and the scheduled result are provided by an authentication center or an authentication authorization and accounting server.

30. A method for performing authentication of a subscriber in a network system comprising a first network control element and a second network control element, the method including:
    performing a first authentication of the subscriber by the first network control element;
    performing a second authentication of the same subscriber by the second network control element, wherein the first authentication step and the second authentication step are performed independently from each other;
    transmitting one predetermined number for the authentication to a communication device;
    calculating a result from the predetermined number in the communication device;
    using a first part of the result for the first authentication;
    using a second part of the result for the second authentication, wherein each authentication is performed by comparing a respective part of the first and second results with a scheduled result; and
    prohibiting the scheduled result for the second authentication from being forwarded to the first network control element.

31. The method according to claim 30, wherein the predetermined numbers and the scheduled result are provided by a home subscriber database.

32. The method according to claim 30, wherein the predetermined numbers and the scheduled result are provided by an authentication center or an authentication authorization and accounting server.

* * * * *